COINCIDENCE DIVIDER

DIVIDER

INVENTOR
R. L. CARBREY
BY R. O. Nimtz
ATTORNEY

Nov. 1, 1966 R. L. CARBREY 3,283,131

DIGITAL SIGNAL GENERATOR

Filed Sept. 25, 1963 4 Sheets-Sheet 2

BINARY COUNTER STAGE

United States Patent Office 3,283,131

Patented Nov. 1, 1966

3,283,131

DIGITAL SIGNAL GENERATOR

Robert L. Carbrey, Madison, N.J., assignor to Bell Telephone Laboratories, Incorporated, New York, N.Y., a corporation of New York Filed Sept. 25, 1963, Ser. No. 311,529
8 Claims. (Cl. 235—164)

This invention relates to data processing circuits and, more particularly, to circuits for generating arbitrary binary word sequences.

As the repetition rate of pulse systems has increased, it has become increasingly difficult to generate test patterns of binary symbols of sufficient length or duration to test adequately such pulse systems. In multi-megacycle pulse systems, for example, test patterns of significant length involve millions of bits which must be repetitively ordered in an exact array in order to test accurately, for example, the error rate of the system. Such accurate repetitions require essentially the ability to count events on this order of magnitude. Economics, however, require that this counting ability be realized by circuit means several orders of magnitude less expensive than the system being tested. The number of states required in an ordinary binary counter to achieve these counts, for example, would very likely rival the system itself in the complexity required to obtain reliable results.

It is an object of the present invention to reduce the cost and complexity of test word generators for multimegacycle pulse systems.

It is a more specific object of the invention to generate multimegabit binary test patterns with simple, reliable circuits.

In order to reduce the complexity of counting circuits, it is desirable to count-down at much higher ratios than the 2:1 ratio utilized in conventional binary counters. Moreover, it is desirable that the count-down circuits be at least as simple, if not more so, than conventional binary count-down stages.

It is therefore an ancillary object of the invention to count down binary events with as high a count-down ratio as desired and with as few active circuit elements as possible.

It is a more specific object of the invention to reduce count downs of arbitrarily high ratios to a single, simple operation which is easily adjustable over a wide range of values.

A further disadvantage of high count conventional binary counters is the large disparity between the repetition rates of the first and last stages of the counter. This would normally require separate designs for the various stages to meet the overall switching time objectives of the entire system, but still allow for the wide divergence in cycling times.

It is therefore a further ancillary object of the invention to count pulse events by means of a multistage counter in which all stages are essentially identical and hence can be fabricated from a common design.

It is a more specific object of the invention to count pulse events by means of a multistage counter, each stage of which has essentialy the same repetition rate.

In accordance with the present invention, these and other objects are achieved by means of a simple combination of count down circuits and multistage counters which are particularly suitable for generating extremely long patterns of binary words for testing multimegacycle pulse systems. More particularly, large count-down circuits are utilized to divide an entire test pattern duration into a plurality of unique segments, the contents of each of which is simply determined by means of multistage counters.

In further accord with the present invention, a count-down circuit which is particularly useful for large count-down ratios and involves little circuit complexity comprises a plurality of blocking oscillators and a coincidence gate. Each blocking oscillator is adjusted, by well-known techniques, to divide input pulses by a fixed ratio to unity which is a prime number, that is, a number which is exactly divisible only by itself and one. The prime number division ratio for each blocking oscillator is different from all the other blocking oscillators. The outputs of all blocking oscillators are applied to the same coincidence gate from which an output is produced only when all inputs are energized simultaneously. Alternately, the various division ratios need not all be prime, so long as they include no common factors.

It can be seen that the overall division ratio of the entire combination is equal to the product of the division ratios of the individual blocking oscillators. It is therefore possible, with a small number of blocking oscillators each having a reasonably small division ratio, to provide an overall division ratio which is relatively large. Furthermore, the accuracy and reliability of this large division ratio are just as good as the individual blocking oscillators themselves, working on such smaller division ratios.

In further accord with the present invention, multistage counting circuits are provided in which all stages are substantially identical. A counter in which the state of the output is determined by the phase of the output on a single lead can be constructed by utilizing blocking oscillators having a division ratio equal to the base or radix of the numbering system being used. Each stage of such a counter can be advanced merely by delaying the application of a clock pulse by an increment of phase corresponding to the selected phase-determined radix. Moreover, each stage of this counter is essentially identical to all other stages.

In the special case where the phase-determined counter operates on the binary radix, further advantages are apparent. A single active element (the blocking oscillator) is required instead of the two required for conventional binary cells. Alternating current coupling is possible for all states of the counter and for any state duration. Inversion of an output can be accomplished by a simple transformer. The duty factors of the stages as well as their repetition rates are all essentially constant. Finally, all stages are alike in being subjected to the same driving sequences and providing substantially identical output waveforms.

These and other objects and features, the nature of the present invention and its various advantages, may be more readily understood upon consideration of the attached drawings and the following detailed description of the drawings.

Figure 1:
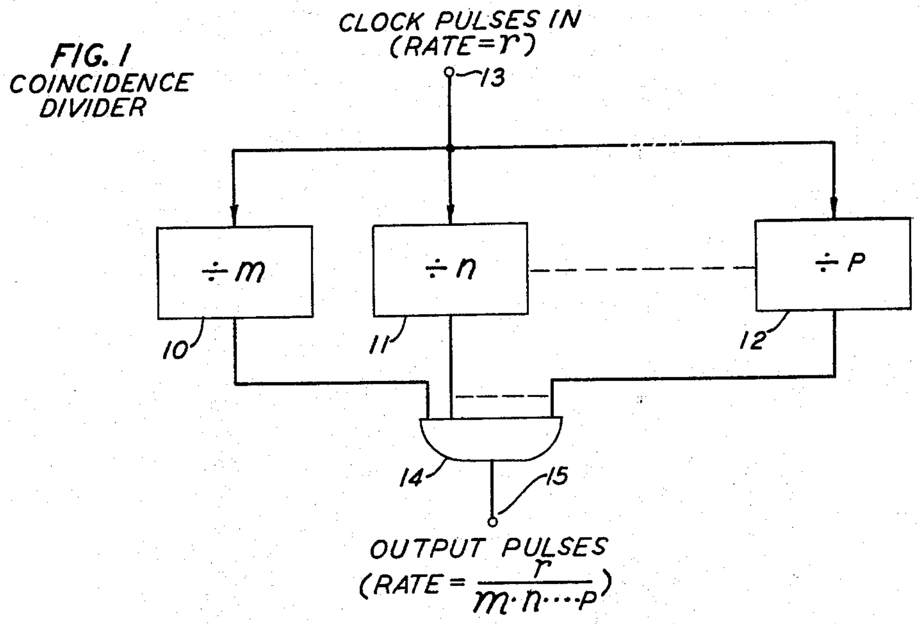
FIG. 1 is a schematic block diagram of a coincidence divider circuit in accordance with the present invention.

Referring more particularly to FIG. 1, there is shown a coincidence divider circuit comprising a plurality of basic pulse dividers 10, 11 and 12, the inputs of which are connected to terminal 13. Clock driving pulses at a pulse repetition rate *r* are applied to input terminal 13. The outputs of basic divider circuits 10, 11 and 12 are applied to the inputs of AND gate 14. AND gate 14 is of the type well known in the art which produces an output at output terminal 15 when, and only when, inputs are applied to each and every one of its input terminals. Such AND gates can be constructed with diodes, transistors, vacuum tubes and numerous other devices and are sufficiently well known in the art that further description here is not necessary.

The dividing ratio of basic divider 10 is represented by *m*, the dividing ratio of basic divider 11 is *n* and that of divider 12, *p*. In accordance with the present invention, *m*, *n* and *p* may be prime number integers, that is, integers exactly divisible only by themselves and by unity. Alternatively, these numbers may be chosen such that *m*, *n* and *p* have no common integral factors. Thus, one or more of these integers may not be itself a prime number so long as none of its factors are found in any of the remaining division ratios nor their factors.

The pulse repetition rate at output terminal 15 is equal to the input repetition rate divided by the product of the basic divider ratios. This can be easily seen if it is realized that dividers 10, 11 and 12 will produce coincident inputs to AND gate 14 only on the first clock pulse and thereafter only after a number of input pulses equal to the product of their individual division ratios. While only three basic dividers are illustrated, it is obvious that any number of basic dividers could be used.

The circuit of FIG. 1 provides pulse division ratios which can be many orders of magnitude larger than the division ratios of simple basic pulse dividers. Thus, for example, six basic pulse dividers having individual division ratios of 10, 11, 13, 17, 19 and 21, respectively, will provide a coincidence output only once in every 9,699,690 input pulses. Such large division ratios, moreover, are obtained with an accuracy and reliability as good as the accuracy and reliability of the basic dividing circuits themselves. These basic dividing ratios can easily be chosen to be well within the capability of the art to realize.

Figure 2:
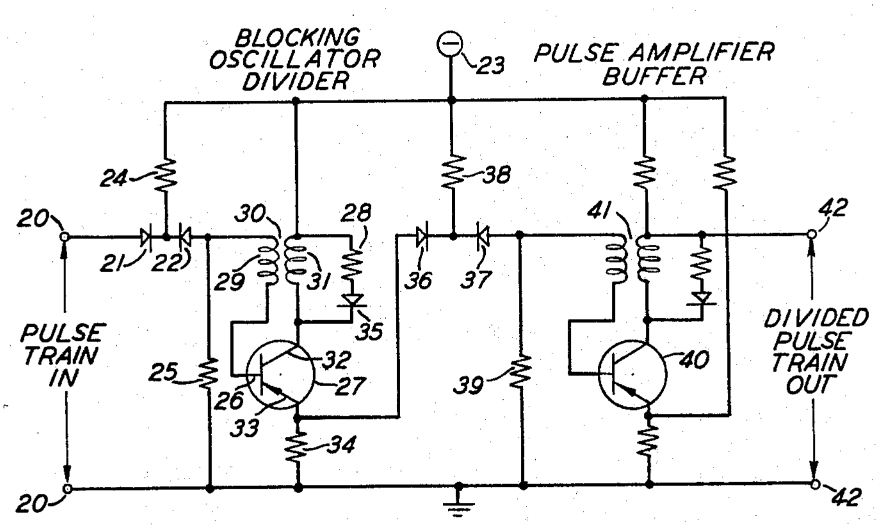
FIG. 2 is a detailed schematic diagram of a blocking oscillator pulse dividing circuit useful in the coincidence divider of FIG. 1.

In FIG. 2 there is shown a basic divider circuit which could be used for any one or all of dividers 10, 11 and 12 of FIG. 1. An input pulse train, applied across input terminals 20, is applied to an isolation gate including diodes 21 and 22, biased from voltage source 23 through resistor 24. The isolation gate comprising diodes 21 and 22 serves to isolate the balance of the circuit from spurious fluctuations in the input voltage not representing the application of a pulse, and to isolate the input circuits connected to terminals 20 from the pulse produced by the divider. Resistor 25 provides bias for the base electrode 26 of a transistor 27. Base electrode 26 is connected to diode 22 through the secondary winding 29 of a feedback transformer 30. The primary winding 31 of transformer 30 is connected to the collector electrode 32 of transistor 27 while the emitter electrode 33 is returned to ground through resistor 34.

It can be seen that transistor 27 and transformer 30 are interconnected to form a blocking pulse oscillator. That is, a voltage pulse, applied to base electrode 26, and which is sufficiently negative to cause transistor 27 to begin to conduct, causes a collector current to flow through primary winding 31. Winding 31 is coupled to secondary winding 29 in such a sense as to drive transistor 27 still further into conduction. This regenerative action rapidly drives transistor 27 into saturation, bringing collector 32 to nearly the same potential as emitter 33. Substantially all of the voltage of source 23 therefore appears across primary winding 31, resistor 34 being small in comparison to the impedance of winding 31. The sudden collapse of this voltage when saturated transistor 27 can no longer supply the increasing current to maintain the voltage causes a sharp negative-going voltage transient which is coupled back through secondary winding 29 to rapidly turn transistor 27 off.

Since the energy stored in the field of transformer 30 cannot dissipate instantly, it causes a current reversal which attempts to drive the collector voltage of transistor 27 still more negative than battery 23. When the voltage thus developed exceeds the small forward bias necessary to drive diode 35 to its low impedance forward-conducting state, diode 35 acts as a low impedance short across the transformer 31 and prevents a further collector swing in the negative-going direction.

Because of the collapsing energy field, the current continues to flow through the primary 31 and diode 35 until such time as it has decayed to less than the value required to keep diode 35 forward biased. The decay of this current occurs with a time constant $L/R$ where R is the forward resistance of diode 35, plus the resistance of resistor 28 plus the resistance of primary winding 31 in parallel with any resistance reflected into the primary from the secondary circuit by transformer action, and L is the inductance of winding 31 plus the mutual inductance between windings 29 and 31.

It can be seen that the length of time required for the current to decay below the value which will hold diode 35 in the low forward impedance state is inversely proportional to the effective series resistance and directly proportional to the effective series inductance. The recovery interval can therefore be adjusted by selecting the transformer inductance, the diode forward resistance, and the resistance of series resistor 28. At very low recovery rates, resistor 28 may not be needed.

During the time that the diode is in the low impedance state, the transformer feedback circuit is effectively short-circuited. Any pulses applied to the input by way of input terminals 20 during this interval will be unable to trigger the circuit. The circuit will be retriggered, however, on the first pulse which occurs after the current in primary winding 31 has decayed below the value which will hold diode 31 in its low impedance, forward-biased state. This pulse initiates another cycle of operation, causing another output pulse to be generated at emitter terminal 33.

In the manner described above, transistor 27 operates to divide the pulse rate applied to terminals 20 by a ratio directly controlled by the circuit constants. The output of transistor 27, appearing across resistor 34, is applied to a second isolation gate formed by diodes 36 and 37, biased from voltage source 23 through resistor 38. The output of the isolation gate including diodes 36 and 37 is applied to a second blocking oscillator including a second biasing resistor 39, a second transistor 40 and a second feedback transformer 41. The operation of this second blocking oscillator corresponds exactly to the operation of the oscillator including transistor 27. It will be noted, however, that it is arranged to respond to each and every one of the output pulses from transistor 27, that is, has a shorter recovery time than the first blocking oscillator. Thus, transistor 40 operates as a pulse standardization circuit for the output pulses from the pulse divider. These output pulses appear across output terminals 42.

It can be seen that the duration of the pulses produced by transistor 27 may not be the same for all circuits because different size transformers corresponding to transformer 30 will be used for the various dividers having varying dividing ratios. However, all transformers corresponding to transformer 41 can be made idential so that the output pulses from transistor 40 will all be of a standard duration and amplitude. This circuit also serves to isolate the divider blocking oscillator containing transistor 27 from the variations in impedance which may appear across output terminals 42.

The divider illustrated in FIG. 2 is just one of the many pulse divider circuits known in the art which will be useful in the coincidence divider circuit of FIG. 1. Other divider circuits, such as binary cells, ring counters and various other types of counters, would be equally suitable. The circuit of FIG. 2, however, has the advantage of requiring only one or two active elements and yet providing a stable output at a relatively high power level.

Figure 3:
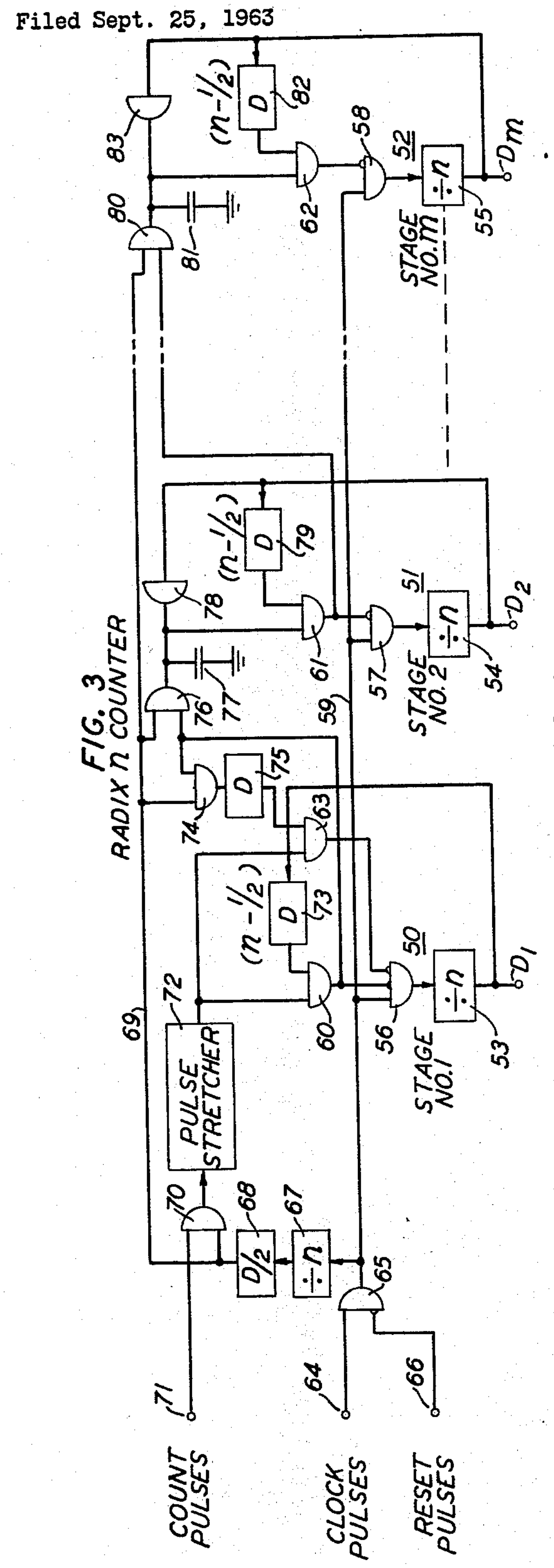
FIG. 3 is a schematic block diagram of a phase shift counter circuit for counting in radix $n$ in accordance with the present invention.

In FIG. 3 there is shown a phase shift counter in accordance with the present invention which is suitable for counting in a number system having any radix desired. In this connection, a phase shift counter may be defined as a counter having a number of stages equal to the number of digits of the numbering system used, each stage of which is capable of producing pulses in a plurality of different and unique phases equal to the radix of the numbering system used. Thus, unlike most conventional counters, the value of the digits of a phase shift counter are represented by the phase of a continuous output pulse train, rather than by the amplitude or permutation of the output.

The phase shift counter in FIG. 3 comprises a plurality of stages, only three of which are illustrated, stages 50, 51 and 52. Each stage comprises a pulse divider circuit which may be identical to the divider circuit of FIG. 2, or may be of the form to be hereinafter described in connection with FIG. 5. Thus the first stage, stage 50, includes a pulse divider circuit 53; the second stage 51 a pulse divider circuit 54; and the last stage, stage 52, a pulse divider circuit 55. Each of pulse dividers 53, 54 and 55 is arranged to divide input pulses by the same ratio $n$ which is equal to the desired radix of the counter.

The inputs of dividers 53, 54 and 55 are applied from inhibit gates 56, 57 and 58, respectively. Gates 56 through 58 normally serve to pass clock pulses appearing on bus 59 but, upon the application of an inhibit pulse from AND gates 60, 61, 62 or 63, block the application of the clock pulses to the respective dividers.

The entire counter circuit of FIG. 3 is driven by regular clock pulses applied to terminal 64 from a clock pulse source, not shown. These clock pulses are supplied to an inhibit gate 65, the output of which is applied to clock pulse bus 59. Reset pulses applied to terminal 66 block the passage of clock pulses through inhibit gate 65 for the duration of these reset pulses.

The clock pulses on bus 59 are applied to a divider circuit 67 which also divides the input pulse train by the radix $n$ of the counter. Divider 67 may be similar to dividers 53, 54 and 55 and provides on its output a pulse train having a repetition rate $1/n$ times the input pulse rate. This divided pulse train is applied to delay network 68 having a delay equal to one-half of the period D of the input clock pulses. The output pulses from delay line 68 are applied to bus 69 and comprise a reference phase.

The output from delay line 68 is also applied to AND gate 70 to which there are also applied count pulses from input terminal 71. Input count pulses are therefore enabled only in the reference phase and, by means of a pulse stretcher 72, are extended over all of the distinguishable phases of the counter, that is, $n$ clock pulse periods.

The output of pulse stretching circuit 72 is applied to one input of each of AND gates 60 and 63. The remaining input to AND gate 60 is the output of divider circuit 53 delayed for $(n-1/2)$ clock pulse periods in delay line 73. The remaining input to AND gate 63 is the output of AND gate 74 delayed by one clock pulse period in delay line 75. The output of AND gate 60 forms one input to AND gate 74 while the output of delay line 68 on bus 69 forms the remaining input to AND gate 74.

It can easily be seen that AND gate 60 provides an inhibit pulse whenever a count pulse coincides with the phase of the output from divider circuit 53 on the previous cycle. The clock pulse in this phase is therefore blocked at gate 56 and divider 53 does not produce its next output until the next succeeding phase of the clock pulses. The output of divider 53 then continues to produce pulses in the new phase.

It can be seen that the counting stage 50 is advanced in phase in the next succeeding cycle of operation following the appearance of a count pulse due to the delaying action of AND gate 70 and pulse stretcher 72. If the count pulses arrive in rapid succession, the $(n+1)$th count pulse must be effective immediately following the $n$th count pulse to avoid continuous accumulation of delay. AND gate 74 is therefore provided to determine if the output of AND gate 60 is in the reference ($n$th) phase and, if so, and if a count pulse is present in the next cycle, as determined by delay line 75 and AND gate 63, to provide an ancillary inhibit pulse. This inhibit pulse is applied to inhibit gate 56 to inhibit the application of clock pulses in the same manner as the output of gate 60.

The output of AND gate 60 is also applied to one input of AND gate 76 in stage 51 of the counter circuit. The other input to AND gate 76 is obtained from reference phase bus 69. When fully enabled, AND gate 76 deposits a charge on storage capacitor 77 which remains until discharged by the enablement of discharge gate 78. The charge on capacitor 77 is applied as one input of AND gate 61, the remaining input of which comprises the output of divider circuit 54 delayed by $(n-1/2)$ clock periods in delay line 79. The output of divider circuit 54 also enables discharge gate 78 to remove the charge from capacitor 77.

It can be seen that AND gate 76 is fully enabled whenever stage 50 is transferred from the reference phase to the next succeeding phase. AND gate 61 is fully enabled in that phase in which stage 51 is operating, but a full cycle later, to advance the phase of operation of stage 51 to the next succeeding phase.

Stage 52 is identical to stage 51 and operates in a similar manner. The output of AND gate 61 is applied to the one input of the charging AND gate (similar to gate 76) in the next succeeding stage. The output of the inhibiting AND gate (similar to gate 61) in the stage immediately preceding stage 52 is applied to one input of charging AND gate 80. The other input to AND gate 80 is derived from bus 69. When fully enabled, gate 80 deposits a charge on capacitor 81 which enables one input of AND gate 62. The other input to AND gate 62 is the output of divider circuit 55 delayed $(n-1/2)$ clock periods in delay line 82. The output of divider circuit 55 also enables discharge gate 83 which removes any charge previously stored on capacitor 81 by the enablement of AND gate 80.

It can be seen that the counter circuit of FIG. 3 operates to count pulses appearing at terminal 71 in a numbering system having a radix of $n$ where the $n$ is the division ratio of each of circuits 53, 54 and 55. The numbering system has a number of digits equal to the number of stages in the counter. While only three stages have been illustrated for the purpose of simplicity, the total number of stages in the counter may be of any convenient number and has been represented by $m$, the last stage being the $m$th stage.

The output of the counter of FIG. 3 can be connected directly to circuitry arranged to operate directly on the phase-displaced output pulses. Alternatively, a translator may be provided in the form of tapped delay lines or similar circuitry to translate this phase displacement into pulse appearances on physically separated leads. If the output is translated in this manner, more or less conventional pulse circuitry can be be used to further process the count information.

It can be seen that a phase displacement counter such as that disclosed in FIG. 3 may be designed to have an exceptionally high counting range. The counting range is equal to the total number of discrete and uniquely different combinations of outputs at the output terminals. The number of such discrete outputs, of course, is equal to $(n^m)$. In one particularly useful form, the counter of FIG. 3 may be arranged to divide by the ratio 10 and thus form a decimal counter of unusual simplicity. Of course, any other radix may be used equally well and the number of stages selected for convenience.

Another particularly valuable embodiment of the phase displacement counter, shown in general form in FIG. 3, is the binary phase displacement counter where the dividing ratio of each of the divider circuits is made equal to two. Such a binary phase displacement counter is illustrated in more detail in FIG. 4.

Figure 4:
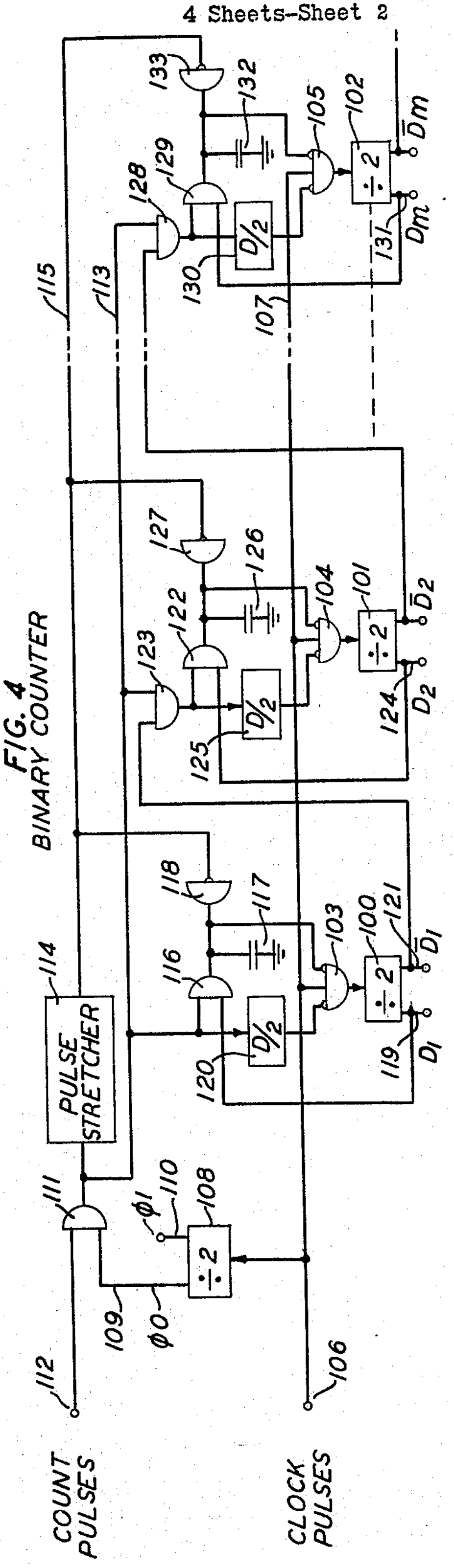
FIG. 4 is a schematic block diagram of a phase shift binary counter in accordance with the present invention.

As can be seen in FIG. 4, the binary phase displacement counter comprises a plurality of stages similar in many respects to the stages of the counter of FIG. 3. Thus the three stages illustrated each include a pulse dividing circuit, dividers 100, 101 and 102, respectively, which divide the input pulse train by a factor of two, since the radix of the binary numbering system is two. These pulse dividers are each driven by clock pulses from one of clock pulse inhibit gates 103, 104 and 105, respectively. Clock pulses are applied to gates 103, 104 and 105 from clock pulse input terminal 106 by way of clock pulse bus 107.

Each of clock pulse inhibit gates includes, in addition to a clock pulse input, two inhibit inputs which, when either is energized, prevent the passage of clock pulses through their respective gates.

The clock pulses appearing on bus 107 are also applied to a divider circuit 108 which, like dividers 100, 101 and 102, divides the input pulse train by a factor of two. Each of pulse dividers 100, 101, 102 and 108 provides two outputs, each of which comprises a pulse train with twice the period (and one-half the repetition rate) of the input pulse train. These two outputs, however, are each the inverse of the other, that is, a pulse appears in one pulse train for every space in the other pulse train, and a space appears in the one pulse train for each pulse in the other. The outputs of divider 108, appearing on output leads 109 and 110, have been labeled phase zero and phase one, respectively, and serve as phase reference for the balance of the circuit.

The phase zero output of divider 108, appearing on lead 109, is applied to one input of AND gate 111, the other input of which is derived from count pulse input terminal 112. Thus, count pulses applied to input terminal 112 are standardized in time by the operation of AND gate 111 so as to always appear in the phase zero time slot. The output of AND gate 111 is applied to phase zero count bus 113 to be used in the input logic for all of the stages of the counter of FIG. 4.

The output of AND gate 111 is also applied to a pulse stretching circuit 114 which stretches the input phase zero count pulse to overlap two successive clock pulses. Thus the stretched count pulses appearing on stretched count bus 115 overlap a phase one clock pulse immediately following the phase zero time slot generated by AND gate 111 and the immediately following phase zero clock pulse.

Each stage of the binary counter of FIG. 4 includes a capacitor storage circuit similar to the storage circuits of FIG. 3. In the first stage, a charging AND gate 116 deposits a charge on capacitor 117 each time both of its inputs are simultaneously energized. A discharging inhibit gate 118 removes this charge whenever its single input is not energized. One input of AND gate 116 is obtained from phase zero count bus 113 while the other input is obtained from the regular or uninverted output of divider 100, appearing on output lead 119. The single input to discharge inhibit gate 118 is obtained from stretched count bus 115.

The charge voltage on capacitor 117 provides one inhibiting input to clock pulse inhibit gate 103. The other inhibit input to gate 103 is obtained from phase zero count pulse bus 113, delayed one-half of a clock pulse period in delay line 120. This delay insures that phase zero count pulses from bus 113 will overlap the succeeding phase one clock pulse.

It can be seen from the above description that each count pulse applied to terminal 112 will, by way of AND gate 111 and delay line 120, inhibit the application of a phase one clock pulse through gate 103. If divider circuit 100 is counting in phase one, the absence of a single phase one clock pulse will cause the divider 100 to pause until the next succeeding phase zero clock pulse and then to continue its dividing action thereafter so as to produce phase zero outputs on output lead 119. This change of phase of the output pulse train represents a transition in the count from a binary "1" to a binary "0."

If the divider 100 is already counting in phase zero, AND gate 116 will be fully enabled on the appearance of a count pulse since these count pulses are time slotted in phase zero by way of AND gate 111. A charge will therefore be deposited on capacitor 117 which inhibits the application of clock pulses through gate 103. It will be noted that the charge voltage on capacitor 117 will inhibit the same phase one clock pulse inhibited by the action of delayed phase zero count pulses from bus 113. Capacitor 117, however, will continue to hold its charge and this voltage will also inhibit the next succeeding phase zero clock pulse. Thus divider 100 will advance from dividing in phase zero and begin dividing in phase one. This change of phase of the output pulse train represents a transition from a binary "0" to a binary "1."

During this interval when a charge is being deposited on capacitor 117 by way of gate 116, discharge inhibit gate 118 is inhibited by the appearance of a stretched count on bus 115. This stretched count is derived from the same phase zero count pulse which enables charging gate 116. Thus the charge on capacitor 117 is retained until the stretched count pulse from bus 115 terminates. As already noted the stretched count pulse does not terminate until after one phase one clock pulse followed by one phase zero clock pulse. Thus the charge remains on capactor 117 sufficiently long to permit the "0" to "1" transition.

From the above description, it is apparent that the first stage of the binary counter of FIG. 4 changes "state," that is, output phase, for each application of a count pulse to terminal 112. As is well known, each succeeding stage of a binary counter is arranged to change state only when the preceding stage makes a transition from a binary "1" to a binary "0."

To this end, the second stage of the binary counter of FIG. 4, including divider circuit 101, is arranged to change the phase of its output each time divider 100 makes a transition from phase one to phase zero. The inverted output of divider 100, appearing on lead 121, is applied to one input of AND gate 123, the remaining input of which is derived from phase zero count pulse bus 113. The output of AND gate 123 is applied to one input of charging AND gate 122 while the other input to gate 122 comprises the regular or uninverted output of counter 101 on output lead 124. The output of AND gate 123 is also applied to one inhibit input of clock inhibit gate 104 after being delayed by one-half of a clock pulse period in delay line 125.

When fully enabled, charging AND gate 122 deposits a charge on capacitor 126 which provides a voltage to the remaining inhibit input of gate 104. A discharge inhibit gate 127, energized by stretched count pulses on bus 115, prevents the discharge of capacitor 126 while a pulse is present on bus 115.

It is apparent that AND gate 123 produces an output whenever divider 100 is counting in phase zero and a count pulse appears. If divider 101 is already counting in phase one, the output of AND gate 123, after a half period delay in delay line 125, will inhibit the application of the suceeding phase one clock pulse, causing divider 101 to pause until the succeeding phase zero clock pulse, and then to continue dividing in phase zero.

If divider 101 is already counting in phase zero, charging AND gate 122 will be fully enabled when AND gate 123 is enabled, and a charge is deposited on capacitor 126. The charge voltage on capacitor 126 inhibits gate

104 for the succeeding phase one and phase zero clock pulses, causing divider 101 to pause until the next phase one clock pulse, and then to continue dividing in phase one. Discharge inhibit gate 127 allows capacitor 126 to discharge after the termination of the stretched count pulse.

The last stage of the binary counter of FIG. 4, including divider circuit 102, as well as all intervening stages, are identical to the second stage and operate in a similar manner. Thus, the inverted output from the divider just preceding divider 102 is applied to one input of AND gate 128, the other input of which is taken from phase zero count pulse bus 113. The output of AND gate 128 is applied to one input of charging AND gate 129 and, by way of delay line 130, to one inhibit input of clock pulse inhibit gate 105. The remaining input to charging AND gate 129 is obtained from the regular or uninverted output of divider 102 on output lead 131. When fully enabled, charging AND gate 129 deposits a charge on capacitor 132 and the charge voltage enables the remaining inhibit input of gate 105. A discharge inhibit gate 133 permits the discharge of capacitor 132 only after the termination of stretched count pulses on bus 115.

From the above description, it is apparent that the counter of FIG. 4 serves to count pulses applied to input terminal 112 in the binary notation and to represent each binary state by the phase of the output pulse trains from the particular stages. These pulse trains can be utilized as they are generated or can be translated to standard static binary representations by means of comparisons with the reference phase outputs from divider 108. It should be noted, however, that many logic functions are simplified in the phase shift notation. Inversion or negation, for example, can be accomplished with a simple transformer. In addition, the relatively constant and equal duty factors of all stages of the counter permit standard designs and uniform performance in all stages.

It should be noted that both of the counters disclosed in FIGS. 3 and 4 change phase by blocking the application of a clock pulse to the divider circuits. Such operation can be termed a "retard shift" in a phase displacement counter. It can easily be seen, however, that such counters could also be constructed to permit "advance shift" operation, that is, instead of blocking a clock pulse following the regular dividing action, a clock pulse could be inserted prior to the termination of the regular dividing action. This would require means to reset the divider to its quiescent state immediately in order to render the divider responsive to the inserted clock pulse, but such operation is easily implemented. In the divider of FIG. 2 for example, an auxiliary blocking oscillator could be used to respond to the clock pulse to be inserted to dump a sufficiently large current surge into the primary circuit of the regular blocking oscillator to neutralize the heavy circulating current, i.e., the shorting diode could be biased off immediately from an exterior source.

Figure 5:
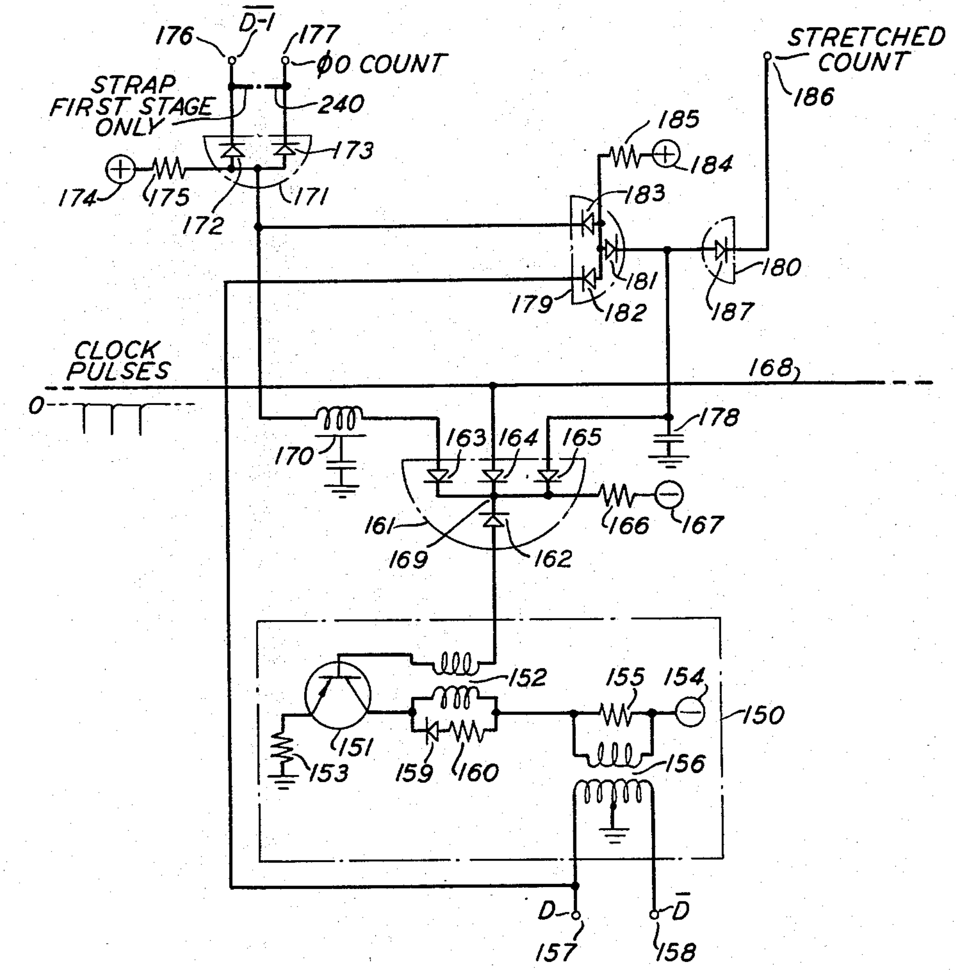
FIG. 5 is a detailed circuit diagram of one stage of the binary counter of FIG. 4.

The binary counter of FIG. 4 may be realized by means of stages like those shown in FIG. 5. While the stage shown in FIG. 5 is highly desirable for this application for many reasons, it is to be understood that many other arrangements would also be suitable, depending on the speed of counting, components available, and many other factors.

In FIG. 5, a blocking oscillator pulse divider 150 comprises a transistor 151 having its base and collector regeneratively coupled by a transformer 152 and its emitter connected to ground through a resistor 153. Operating voltage is supplied to the collector of transistor 151 from a negative source 154 through load resistor 155 and the pirmary winding of transformer 152. An output transformer 156 has its input winding connected across resistor 155 and its center-tapped output winding provides outputs at terminals 157 and 158. A diode 159 and a resistor 160 are connected across the primary winding of transformer 152. The blocking oscillator of FIG. 5 is very similar to that of FIG. 2 and hence a detailed description of its operation is not belived to be warranted. Transistor 151, transformer 152, diode 159 and resistor 160 are, of course, chosen such that divider 150 divides the clock pulse train by a factor of two.

The input to divider circuit 150 is derived from a diode inhibiting gate 161 comprising four diodes 162, 163, 164 and 165 and biased through resistor 166 from negative voltage source 167. In the absence of a clock pulse from bus 168, diode 164 is forward biased by source 167 to provide a voltage at point 169 close to zero. Diode 162 remains reverse biased under these conditions and no current can flow in the base circuit of transistor 151. A negative-going clock pulse on bus 168 reverse biases diode 164 allowing point 169 to fall to the negative voltage of source 167. Under this condition, diode 162 is forward biased and a base current triggers transistor 151 into conduction. As noted with respect to FIG. 2, this transistor action is regenerative, causing large voltage pulses at the output terminals 157 and 158.

It will be observed that a voltage applied to the anode of diode 163 or diode 165 which is less negative than source 167 will cause the corresponding one of these diodes to conduct. The voltage drop across resistor 166 will, in this case, bias diode 162 in a reverse direction and thus prevent the triggering of pulse divider 150 even in the presence of a clock pulse. Thus gate 161 does provide the inhibiting action required.

The anode of diode 163 is connected through delay circuit 170 to diode AND gate 171. AND gate 171 comprises two diodes 172 and 173, biased from positive voltage source 174 through resistor 175. Diodes 172 and 173 are normally forward biased so that the current drop through resistor 175 provides an output voltage insufficient to forward bias diode 163 by way of delay line 170. Simultaneous appearance of positive pulses at inputs 176 and 177, however, will reverse bias both of diodes 172 and 173, and the output voltage from gate 171 will rise to the supply voltage 174. Diode 163 will be forward biased by this positive voltage to inhibit gate 161.

The anode of diode 165 of gate 161 is connected to capacitor 178. Capacitor 178, in turn, is connected to charging AND gate 179 and discharge inhibiting gate 180. Charging AND gate 179 comprises three diodes 181, 182 and 183 and is biased from positive voltage source 184 through resistor 185. Diodes 182 and 183 are normally conducting and the voltage drop thus caused across resistor 185 maintains diode 181 in a reverse biased condition. The simultaneous appearance of positive voltages at the cathodes of diodes 182 and 183, however, reverse biases these diodes, causing the anode of diode 181 to rise to the voltage of source 184. Diode 181 is forward biased under this condition and a charge is deposited on capacitor 178. This charge forward biases diode 165 to inhibit gate 161.

The presence of a positive voltage pulse at terminal 186 reverse biases diode 187 in discharge inhibiting gate 180 and thus blocks this discharge path for capacitor 178. When the positive voltage pulse at terminal 186 ceases, capacitor 178 discharges through diode 187 and the low impedance source connected to terminal 186.

It can be seen that the circuit of FIG. 5 provides all of the logic necessary for each stage of the binary counter of FIG. 4. A strap 240, shown in dashed lines, can be connected between terminals 176 and 177 for the first stage of such a binary counter. All other stages are identical to FIG. 5.

It can be seen that the binary phase displacement counter of FIG. 4 produces at its output terminals pulse trains which are representative of binary digits and that the value of the binary digit is determined by the phase of the output pulse trains. This arrangement has the advantage over conventional binary counters of providing a continuous dynamic output in every output lead regardless of the value of the count. This prevents long term drift effects in the output common to more conventional arrangements. Moreover, each stage of the counter of FIG. 4 need include only a single active element to perform the pulse division in contrast to more conventional circuits where more than one active element is required.

Figure 6:
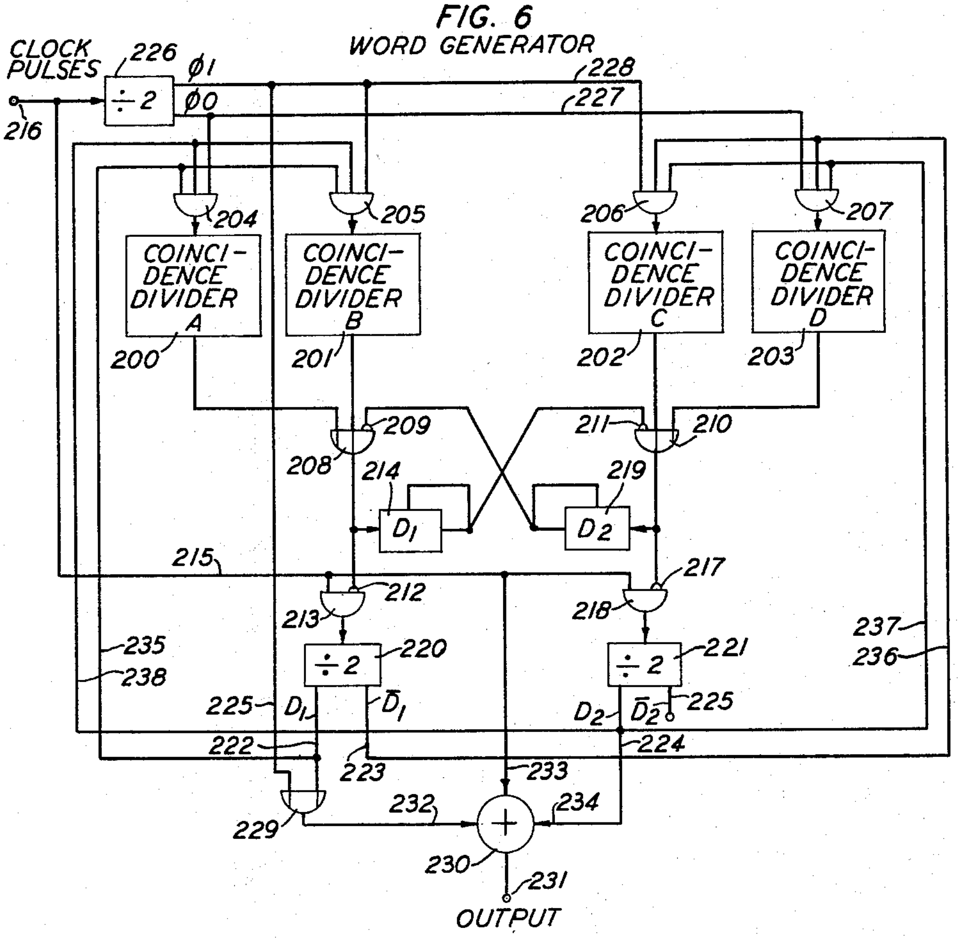
FIG. 6 is a schematic block diagram of a binary word generating circuit in accordance with the present invention utilizing coincidence dividers and a phase shift binary counter.

In FIG. 6 there is shown a binary word generator in accordance with the present invention including coincidence dividers and a phase displacement counter similar to those hereinbefore described. In FIG. 6 there is shown four coincidence dividers 200, 201, 202 and 203 which have been identified by the letters A, B, C and D, respectively. Coincidence dividers 200 through 203 are similar in design to the divider disclosed in more detail in FIG. 1 and will not be further described here except to note that these dividers have unusually high division ratios as described with reference to FIG. 1.

The input to divider 200 (A) is derived from a logical AND gate 204, the input to divider 201 (B) from AND gate 205, to divider 202 (C) from AND gate 206, and the input to divider 203 (D) is derived from AND gate 207. The outputs of dividers 200 and 201 are applied to separate inputs of inhibited OR gate 208. Gate 208 is of the type which will produce an output if any of its normal inputs is energized except in the presence of an inhibit pulse at inhibit input 209.

The outputs of divider circuits 202 and 203 are applied to a second inhibited OR gate 210 which produces an output when either of these inputs are energized, except in the presence of an inhibit pulse at inhibit input 211. The output of gate 208 is simultaneously applied to the inhibit input 212 of an inhibit gate 213, and the input of a tapped pulse delay circuit 214. The other input of gate 213 comprises clock pulses from clock pulse bus 215 obtained from input terminal 216. The outputs of delay circuit 214 are applied to the inhibit input 211 of gate 210.

The output of gate 210 is simultaneously applied to the inhibit input 217 of a second inhibit gate 218, and to the input of a second tapped pulse delay circuit 219. The other input of gate 218 comprises clock pulses from clock pulse bus 215. The outputs of delay circuit 219 are applied to the inhibit input 209 of gate 208.

The output of inhibit gate 213 is applied to pulse divider circuit 220 while the output of inhibit gate 218 is applied to pulse divider circuit 221. Divider circuits 220 and 221 both divide input pulses applied to them by a ratio of two and are similar to divider circuits 100, 101 and 102 in FIG. 4. Indeed, divider circuits 220 and 221 form the stages of a binary phase-displacement counter having two digits and hence capable of counting to four in the binary notation. The counter comprised by dividers 220 and 221 is used, among other things, to distinguish between four separate and unique states of the word generator of FIG. 6.

Like the divider circuits in FIG. 4, dividers 220 and 221 each provide two separate outputs which are the inverses of each other. Thus divider 220 provides at lead 222 a train of pulses having a phase representative of a particular binary digit and represented by the symbol $D_1$. On output lead 223 there appears a train of pulses having a phase opposite to the phase of the pulse train on lead 222 and represented by the symbol $\overline{D}_1$. Similarly, divider circuit 221 provides on lead 224 a train of pulses of a digit "1" representing phase ($D_2$) and on lead 225 a train of pulses of opposite phase ($\overline{D}_2$).

Clock pulses appearing at input terminal 216 are applied to phase splitting divider circuit 226 which provides two output pulse trains of opposite phases. One pulse train, appearing on bus 227, has been arbitrarily identified as phase $\varphi 0$ and is used as a reference to identify this phase. The other output pulse train, appearing on bus 228, has been identified as phase $\varphi 1$ and is used as a reference to identify this phase.

The output of divider circuit 220, appearing on lead 222, is applied to one input of a logical OR gate 229. The other input to OR gate 229 is derived from phase $\varphi 1$ reference bus 228. OR gate 229 is a logical gate of the type which produces an output when either or both of its inputs are energized.

The output of OR gate 229 is applied to one input 232 of modulo-two adder circuit 230. Another input 233 to adder circuit 230 is taken from clock pulse bus 215 while a third input 234 to adder circuit 230 is taken from the output lead 224 from divider circuit 221. Adder circuit 230 is of a type well known in the art which takes the modulo-two sum of its input conditions and supplies this sum as an output at terminal 231. A modulo-two adder is similar to normal adding circuits but, because it is operating in modulo-two, does not provide an indication of carry digits. A truth table for a three-input modulo-two adder would be as follows:

| Input A | Input B | Input C | Output |
|---|---|---|---|
| 0 | 0 | 0 | 0 |
| 1 | 0 | 0 | 1 |
| 0 | 1 | 0 | 1 |
| 1 | 1 | 0 | 0 |
| 0 | 0 | 1 | 1 |
| 1 | 0 | 1 | 0 |
| 0 | 1 | 1 | 0 |
| 1 | 1 | 1 | 1 |

It will be noted that the output of adder circuit 230 is a "1" whenever the number of "1" inputs is odd, and is a "0" whenever this number is even (or zero). Hence, this circuit has sometimes been called an "even/odd" determining circuit. Such circuits can be easily assembled from a cascade of "exclusive-OR" circuits similar to those used in ordinary binary adders. Many other circuit arrangements have also been devised to perform this logical operation.

Figure 7:
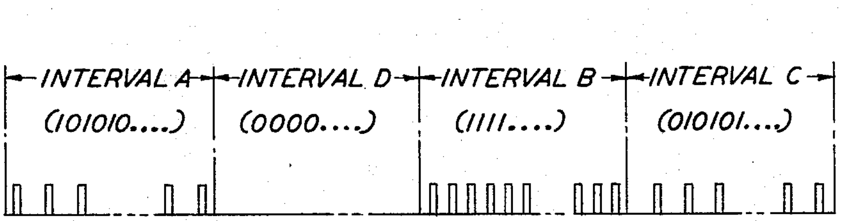
FIG. 7 is a graphic representation of the output pulse train from the generator of FIG. 6.

The circuit of FIG. 6 operates in the following manner: Assuming that clock pulses are being supplied to terminal 216, the circuit of FIG. 6 produces at output terminal 231 a pulse train of precisely determined characteristics and of selectable length or duration. This pulse train, one example of which is illustrated in FIG. 7, is divided into four intervals identified by the letters A, B, C, and D. Interval A corresponds to the period of the output of coincidence divider 200, interval B to the period of divider 201, interval C to the period of divider 202, and interval D to the period of divider 203. Intervals A, B, C, and D are each separately selectable and need not be equal in length. Each interval is characterized by a pulse train having a preselected repetitive property which continues throughout the interval. For the purposes of simplicity, the intervals illustrated in FIG. 7, and implemented in FIG. 6, have been chosen to cover the simplest pulse pattern possible. Interval A, for example, covers a repetition of the pulse pattern "101010 . . .," interval B the pattern "111111 . . .," interval C the pattern "010101 . . ." and interval D the pattern "000000 . . .". These particular patterns, or binary "words," have been chosen for simplicity and are not in any way limiting.

Returning to FIG. 6, assume that divider stages 220 and 221 are both dividing in the phase $\varphi 0$. That is, the output of divider 220 on lead 222 and the output of divider 221 on lead 224 are both in phase $\varphi 0$. The respective outputs on leads 223 and 225, of course, are in the phase $\varphi 1$.

The output of divider 220 on lead 222 is applied, by way of OR gate 229, to input 232 of adder circuit 230. The output of divider 221 is applied directly to input 234 of adder circuit 230. Phase $\varphi 1$ pulses from bus 228 are also applied to input 232 by way of OR gate 229, and clock pulses are applied to input 233 from bus 215. It can be seen that input 232 to adder circuit 230 under these conditions is a train of pulses identical to the clock pulses with divider circuit 220 supplying φ0 pulses and bus 228 supplying φ1 pulses. Hence inputs are present in every time slot at inputs 232 and 233. Input 234, however, provides inputs only in phase φ0. Since the number of inputs to adder circuit 230 is odd only when an input appears at input 234, the output at terminal 231 will also be a pulse train having pulses appear in phase φ0. This pulse train is shown in FIG. 7 during interval A.

While this pulse train is appearing at output terminal 231, the φ0 output pulse from divider 221 is applied by way of feedback leads 235 and 237 to input gates 204, 205, 206 and 207 of the coincidence dividers 200 through 203, respectively. The φ0 output pulses from divider circuit 220 are likewise applied, by way of feedback lead 238, to the input of each of input gates 204 and 205. The φ1 output pulses from divider 220 on lead 223 are applied by way of feedback lead 236 to the input of each of input gates 206 and 207. The remaining input of AND gates 204 and 207 is supplied from φ0 bus 227 and the remaining input to AND gates 205 and 206 is supplied from φ1 bus 228.

Under the assumed conditions, only gate 204 will be fully enabled since all of its inputs are in phase φ0. AND gates 206 and 207 have as one input φ0 pulses from lead 237, and as another input φ1 pulses from lead 236. Since these pulses never coincide, AND gates 206 and 207 are never completely enabled. Similarly, AND gate 205 has φ0 pulses from feedback leads 235 and 238 and φ1 pulses from bus 228 and can likewise never be fully enabled.

Coincidence divider circuit 200 operates on the φ0 input pulses similarly to the coincidence divider of FIG. 1 to provide an output to gate 208 after a period equal to the period of the divided pulse train. As noted with respect to FIG. 1, this division ratio, and hence this period, may be made almost arbitrarily long by a proper choice of the individual dividing ratios of the elementary dividers included within coincidence divider 200. This output pulse from coincidence divider 200 is in phase φ0 and, after passing gate 208, is applied to inhibit input 212 of inhibit gate 213. One clock pulse in phase φ0 is therefore blocked from triggering divider circuit 220 and divider circuit 220 is not triggered until the next clock pulse in phase φ1. Thereafter, divider circuit 220 continues to be triggered by phase φ1 and produces on output lead 222 a train of φ1 pulses. Lead 223 now carries a train of pulses in phase φ0.

Under this condition, the inputs to adder circuit 230 are as follows: clock pulses are applied to input 233; φ1 pulses are applied to input 232, since the output of divider 220 on lead 222 coincides with the phase φ1 pulses from bus 228; and phase φ0 pulses are applied to input 234. Hence, during phase φ0, two inputs are applied to adder 230 (233 and 234), and during phase φ1, two inputs are applied to adder 230 (232 and 233). The number of inputs to adder 230 is therefore always even, and no outputs are produced. This is represented in FIG. 7 by the pulse train "000000 . . . " in interval D (no pulses).

The change in phase of pulses on output lead 222 is fed back by way of lead 238 and prevents the further application of φ0 pulses to coincidence divider 200. AND gate 207, however, becomes fully enabled by φ0 pulses on lead 236, φ0 pulses on lead 237 and φ0 pulses from bus 227. Coincidence divider 203 therefore divides this φ0 input pulse train by its dividing ratio and provides an output to gate 210 after a period equal to the period of the divided pulse train. This pulse, in phase φ0, is passed by gate 210 and applied to inhibit input 217 of gate 218. One clock pulse in phase φ0 is therefore blocked from triggering divider circuit 221 and divider circuit 221 is not triggered until the next clock pulse, in phase φ1. Thereafter, divider circuit 221 continues to be triggered in phase φ1 and produces on output lead 224 in phase φ1. Lead 225, of course, now carries a train of pulses in phase φ0.

Under these conditions, the inputs to adder circuit 230 are as follows: clock pulses are applied to input 233; φ1 pulses are applied to input 232, the output of divider circuit 220 on lead 222 coinciding with the phase φ1 pulses from bus 228; and phase φ1 pulses are applied to input 234 from divider 221. Hence, during phase φ0, only clock pulses are applied to adder circuit 230, and during phase φ1, pulses are applied to adder circuit 230 at all three inputs, 232, 233 and 234. The number of inputs to adder circuit 230 is therefore always odd (one or three), and output pulses are produced in every time slot. This is represented by the pulse "111111 . . . " in interval B in FIG. 7.

The change in phase of pulses on output lead 224 is fed back by way of lead 237 and prevents further application of φ0 pulse to AND gate 207 and divider 203. AND gate 205, however, becomes fully enabled by φ1 pulses on lead 238, φ1 pulses on lead 235, and φ1 pulses from bus 228. Coincidence divider 201 therefore divides this input pulse train by its dividing ratio and provides an output to gate 208 after a period equal to the period of the divided pulse train. This pulse, in phase φ1, is passed by gate 208 and applied to inhibit input 212 of gate 213. One clock pulse in phase φ1 is therefore blocked from triggering divider circuit 220 and divider circuit 220 is not triggered until the next clock pulse, in phase φ0. Thereafter, divider circuit 220 continues to be triggered in phase φ0 and produces an output on lead 222 in phase φ0. Lead 223, of course, now carries a train of pulses in phase φ1.

Under this condition, the inputs to adder circuit 230 are as follows: clock pulses are applied to input 233; φ0 pulses are applied to OR gate 229 from output lead 222 of divider circuit 220 and phase φ1 pulses are applied to OR gate 229 from bus 228; thus, the input pulse train applied to input 232 of adder circuit 230 also carries a pulse in every time slot; and the input to input 234 is a train of pulses on lead 224 from divider circuit 221 in phase φ1. The inputs to adder circuit 230 will therefore be even in phase φ0 and odd in phase φ1. The train of output pulses at terminal 231 will therefore be in phase φ1. This output is represented in FIG. 7 by the pulse "010101 . . . " during interval C.

The change in phase of pulses on output lead 222 is fed back by way of lead 238 to disable gate 205 in phase φ1. AND gate 206, however, becomes fully enabled by φ1 pulses on lead 236, φ1 pulses on lead 237, and φ1 pulses from bus 228. Coincidence divider 202 therefore divides this input pulse train by its dividing ratio and provides an output to gate 210 after a period equal to the period of the divided pulse train. This pulse, in phase φ1, is passed by gate 210 and is applied to inhibit input 217 of gate 218. One clock pulse in phase φ1 is therefore blocked from triggering divider circuit 221 and divider circuit 221 is not triggered until the next clock pulse, in phase φ0. Thereafter, divider circuit 221 continues to be triggered in phase φ0 and produces an output on lead 224 in phase φ0. Lead 225, of course, now carries a train of pulses in phase φ1.

Divider circuits 220 and 221 are again both producing outputs in phase φ0 on leads 222 and 224, respectively, to provide the originally assumed output conditions. The output therefore automatically reverts to "101010 . . . " as illustrated in interval A of FIG. 7. The circuit continues to cycle through the above-described progression so long as clock pulses are applied to input terminal 216.

It will be noted that coincidence dividers 200 through 203 each produce an output pulse upon the application of the first input pulse, as well as after a period equal to the period of their respective dividing ratios. In order to prevent this first pulse from passing the inhibited OR gate (208 or 210) and inhibiting the application of a clock pulse (in gate 213 or gate 218), tapped feedback pulse delay circuits 214 and 219 are provided.

The total delay of circuit 214 is chosen to be equal to twice the period of the clock pulses. The tap on delay network 214 is chosen to provide a delay equal to the period of the clock pulses. Similarly, the total delay of circuit 219 is chosen to be equal to twice the period of the clock pulses A and B, and the tap on delay circuit 219 is chosen to provide a delay equal to the period of the clock pulses. Pulses will therefore emerge from delay circuits 214 and 219 at precisely the times when the initial pulses are generated by the coincidence dividers 200 through 203. These pulses are applied to inhibit inputs 209 and 211 of gates 208 and 210, respectively to inhibit the transfer of these initial pulses.

Two delays in each of circuits 214 and 219 are required to allow inhibiting of phase $\varphi$0 from phase $\varphi$1 as well as phase $\varphi$1 from phase $\varphi$0, and vice versa. Inhibit pulses emerging from delay circuits 214 and 219 at times other than coincidence with the initial outputs of the pulse dividers also inhibit gates 210 and 208, respectively, but since there is nothing to inhibit, have no effect on the operation of the circuit.

The binary word generator of FIG. 6 has been arranged to permit ease of description and understanding. With the described mode of operation, it is clear that the circuit of FIG. 7 could be easily modified to alter the duration, sequence and word content of the output at terminal 231. The individual intervals A, B, C, and D are each controlled by the dividing ratios of coincidence dividers 200 through 203, respectively. As described with reference to FIG. 1, these ratios can be easily varied, on an individual basis, and can provide intervals containing millions of binary "bits" or digits. The basic pulse repetition rate is the same as the clock pulse rate applied to terminal 216. Appropriate logical combinations of the output pulse trains allow a wide choice of the words in each interval. Finally, the addition of further binary dividers similar to divider 220 and 221 can be used to increase the number of intervals into which the output is divided. Only a single additional binary divider, for example, will provide a total of eight distinct output states which can be used to generate eight different binary sequences in the output pulse train.

It therefore appears that the above-described arrangements are merely illustrative of the numerous and varied other arrangements which could constitute applications of the principles of the invention. Such other arrangements may readily be devised by those skilled in the art without departing from the spirit or scope of this invention.

What is claimed is:

1. Binary word generating means comprising a plurality of coincidence divider circuits; each said coincidence divider circuit including a plurality of first pulse dividing circuits having preselected pulse dividing ratios, the dividing ratios of said first pulse dividers within each coincidence divider all being different from the others and including no common integral factors, a pulse coincidence circuit, and means for applying the outputs of all of said first pulse dividing circuits of each coincidence divider to the pulse coincidence circuit in the same coincidence divider; a plurality of second pulse dividing circuits all having the same preselected pulse dividing ratio; a source of clock pulses; means for applying clock pulses from said source to said plurality of coincidence divider circuits and to said plurality of second pulse dividing circuits; means responsive to the outputs of said coincidence divider circuits for selectively disabling the application of said clock pulses to said plurality of second pulse dividing circuits; means responsive to the outputs of said plurality of second pulse dividing circuits for selectively disabling the application of said clock pulses to said plurality of coincidence divider circuits; and means for selectively combining the outputs of said plurality of second pulse dividing circuits.

2. Binary word generating means according to claim 1 wherein said second pulse dividing circuits comprise binary pulse dividing circuits.

3. Binary word generating means according to claim 1 wherein said first pulse dividing circuits comprise prime number pulse dividing circuits.

4. A binary word generator comprising a plurality of coincidence pulse dividing circuits, a phase displacement counter having a plurality of stages, a source of clock pulses, means responsive to the output of said counter for selectively applying clock pulses from said source to said coincidence pulse dividing circuits, means responsive to the outputs of said coincidence pulse dividing circuits for selectively applying clock pulses from said source to said counter, and means for selectively combining the outputs of all of the stages of said phase displacement counter.

5. The binary word generator according to claim 4 wherein each of said coincidence pulse dividing circuits comprises a plurality of basic pulse dividing circuits, each of said basic pulse dividing circuits providing at its output a pulse train having a repetition rate equal to an integral submultiple of the repetition rate of an applied input pulse train, said integral submultiples all being different and including no common integral factors, a pulse coincidence gate, and means for applying the output of each said basic pulse dividing circuit to said pulse coincidence gate.

6. The binary word generator according to claim 4 wherein said phase displacement counter comprises a plurality of basic pulse dividing circuits, all of said basic pulse dividing circuits providing at their outputs pulse trains having repetition rates equal to the same integral submultiple of the repetition rate of an applied input pulse train, normally enabled gating means connected to the input of each said basic pulse dividing circuit, and means responsive to the outputs of said basic pulse dividing circuits to selectively disable said normally enabled gating means.

7. A phase displacement counter comprising a plurality of pulse dividing circuits all having pulse division ratios equal to the radix of the numbering system of said counter, a source of clock pulses, normally enabled gating means connecting said source of clock pulses to each of said pulse dividing circuits, a source of pulses to be counted, means responsive to each of said pulses to be counted for disabling the gating means connected to one of said pulse dividing circuits at the occurrence of an output from that pulse dividing circuit, and means responsive to said pulses to be counted and a preselected output of a next preceding one of said pulse dividing circuits for disabling the gating means connected to each of the remaining pulse dividing circuits at the occurrence of an output from that pulse dividing circuit.

8. An $m$-digit phase displacement counter for counting in the radix $n$ comprising $m$ pulse dividing circuits each having a pulse division ratio of $n$, a source of clock pulses, normally enabled means connecting said clock pulse source to each of said pulse dividing circuits, a source of count pulses, and means for disabling each said normally enabled means in response to count pulses from said count pulse source and in coincidence with the output of the pulse dividing circuit to which that normally enabled means is connected.

References Cited by the Examiner

UNITED STATES PATENTS

| | | | |
|---|---|---|---|
| 2,566,085 | 8/1951 | Green | 328—25 |
| 2,602,140 | 7/1952 | Fink | 331—51 |
| 2,868,455 | 1/1959 | Bruce et al. | 307—88.5 |
| 2,888,557 | 5/1959 | Schneider | 307—88.5 |
| 2,938,193 | 5/1960 | Eckert et al. | 340—168 |
| 2,939,081 | 5/1960 | Dennis | 235—92 |

(Other references on following page)

UNITED STATES PATENTS

| | | | |
|---|---|---|---|
| 3,084,859 | 4/1963 | Smith | 235—92 |
| 3,108,198 | 10/1963 | Lentz | 307—88.5 |
| 3,119,097 | 1/1964 | Tullos | 340—168 |
| 3,141,959 | 7/1964 | Motooka | 235—92 |
| 3,193,770 | 7/1965 | Marshall | 328—155 |

OTHER REFERENCES

Owen, P. L. et al.: An Eight Digit Word Generator, in Electronic Engineering, vol. 32, pp. 134—9, March, 1960 and pp. 212–17, April 1960, pages 134–137 relied on.

ROBERT C. BAILEY, *Primary Examiner.*

J. P. VANDENBURG, *Assistant Examiner.*

Disclaimer 3,283,131.—*Robert L. Carbrey*, Madison, N.J. DIGITAL SIGNAL GENERATOR. Patent dated Nov. 1, 1966. Disclaimer filed Sept. 2, 1971, by the assignee, *Bell Telephone Laboratories, Incorporated.*

Hereby enters this disclaimer to claims 7 and 8 of said patent.

[*Official Gazette December 21, 1971.*]